(12) United States Patent
Khan et al.

(10) Patent No.: US 12,450,523 B2
(45) Date of Patent: Oct. 21, 2025

(54) DEVICE AND METHOD FOR OPTIMISING MODEL PERFORMANCE

(71) Applicant: Kabushiki Kaisha Toshiba, Minato-ku (JP)

(72) Inventors: Aftab Khan, Bristol (GB); Parag Kulkarni, Bristol (GB); Michael Jones, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 851 days.

(21) Appl. No.: 16/042,027

(22) Filed: Jul. 23, 2018

(65) Prior Publication Data

US 2020/0027009 A1 Jan. 23, 2020

(51) Int. Cl.
*G06N 20/20* (2019.01)
*G06F 18/2411* (2023.01)
*G06N 3/08* (2023.01)
*G06N 3/126* (2023.01)
*G06N 5/043* (2023.01)
*G06N 7/01* (2023.01)
*G06N 20/00* (2019.01)

(52) U.S. Cl.
CPC ......... *G06N 20/20* (2019.01); *G06F 18/2411* (2023.01); *G06N 3/08* (2013.01); *G06N 3/126* (2013.01); *G06N 5/043* (2013.01); *G06N 7/01* (2023.01); *G06N 20/00* (2019.01)

(58) Field of Classification Search
CPC ........ G06N 5/043; G06N 20/00; G06N 20/10; G06N 20/20; G06N 3/08; G06N 3/126; G06N 7/005; G06K 9/6269
See application file for complete search history.

(56) References Cited

U.S. PATENT DOCUMENTS

| | | | |
|---|---|---|---|
| 10,296,848 B1* | 5/2019 | Mars | G06N 20/20 |
| 12,067,482 B1* | 8/2024 | Perumalla | G06F 18/2193 |
| 2018/0032908 A1* | 2/2018 | Nagaraju | G06F 11/30 |
| 2018/0367423 A1* | 12/2018 | Tan | G06F 16/2465 |
| 2019/0037638 A1* | 1/2019 | Kasaragod | H04W 88/02 |
| 2019/0354809 A1* | 11/2019 | Ralhan | G06F 16/116 |

FOREIGN PATENT DOCUMENTS

WO WO-2018101862 A1 * 6/2018 ............. G06N 20/00

* cited by examiner

*Primary Examiner* — Daniel T Pellett
(74) *Attorney, Agent, or Firm* — Oblon, McClelland, Maier &Neustadt, L.L.P.

(57) ABSTRACT

A device for optimizing model performance includes: a memory resource storing a local model on an electronic device; and a first processor. The local model is obtained by use of a machine learning process. The first processor: obtains data at the electronic device; applies the local model to the data or further data derived from the data to obtain at least one local model result; generates a measure of the quality of the local model result, and sends the data, further data derived from the data and/or the local model result through a communication device to a second processor for use in updating a global model based on the measure of the quality of the local model result.

4 Claims, 7 Drawing Sheets

DEVICE AND METHOD FOR OPTIMISING MODEL PERFORMANCE

FIELD

Embodiments described herein relate generally to improving model performance in edge devices on a network.

BACKGROUND

The use of Internet-of-Things (IoT) devices has been growing and is expected to continue growing. These devices produce a large amount of data that traditional approaches are not capable of handling. For example, it is highly prohibitive to communicate all the data captured by IoT devices to a central server for processing. Such an approach will take a long time to process and very likely more time to process than the rate at which data is received. As a result, in order to keep up with this rate of incoming data, the central server will have to be upgraded with increased processing power, resulting in increased costs and energy consumption.

Edge refers to node or gateway devices that have previously been used for merely sensing, usually with a high communication overhead. In general, an edge node is an electronic device that can form an endpoint of a network connection. An edge node can be a device on an Internet-of-Things (IoT) (an "IoT device"), that can collect data and exchange data on a network. Processing of all this data is performed on a central server that, having captured all of the sensed data from various edge devices, makes informed decisions. For example, air quality sensors deployed in various parts of a city capture and transmit sensed data to a central server which can make a prediction regarding air quality in the future based on these measurements. Similarly, sensing data captured on a smart wristband can be transmitted to a central server where decisions regarding a person's health can be made. All such approaches have a significant limitation when the number of IoT devices are increased, i.e. scalability is a major problem. However, with more processing capabilities on the edge devices, it is possible to perform small scale decision making, for example making decisions using a pre-trained model with the captured data.

In recent times, there has been a growing trend in enabling decision making capabilities on the node/gateway devices. This means that devices on the edge of the network, i.e. edge nodes, can process some of the raw data and communicate only the decision. However, this means that it becomes increasingly important to keep the decision making capability of the edge devices up to date. For example, if a new situation is encountered by an edge device, the decision making model might make mistakes which if processed on a cloud server along with up to date data from other nodes might yield different results. This is sufficient for some applications, for example when making simple decisions, but with many of the applications this is not practical.

In the following, embodiments will be described with reference to the drawings in which.

DETAILED DESCRIPTION

Figure 1A:
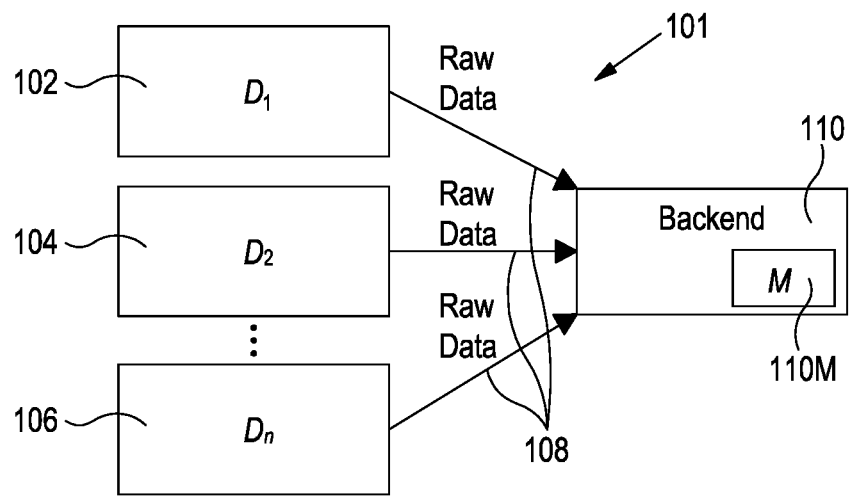
FIG. 1A shows a schematic representation of a conventional device transporting raw data.

According to an embodiment there is provided a device for optimising model performance comprising: a memory resource storing a local model on an electronic device, the local model being obtained by the use of a machine learning process; a first processor configured to: obtain data at the electronic device; apply the local model to the data or further data derived from the data to obtain at least one local model result; generate a measure of the quality of the local model result, and send the data, further data derived from the data and/or the local model result through a communication device to a second processor for use in updating a global model based on the measure of the quality of the local model result.

The second processor may be configured to activate an update of the global model based on the measure of the quality of the local model result to obtain the updated global model.

The second processor may be linked by a network to a plurality of electronic devices, the second processor may be configured to send updated global model data to at least one of the electronic devices and update the local model on the respective electronic devices based on the updated global model data.

The second processor may be configured to update the global model in response to the data, the further data derived from the data and/or the local model result being received by the second processor.

The first processor may be configured to send the data, further data derived from the data and/or the local model result to the second processor in dependence on a comparison between the measure of the quality of the local model result and a threshold.

The second processor may be configured to activate the update of the global model in dependence on a comparison between the measure of the quality of the local model result and the threshold.

The measure of the quality of the local model result may be dependent on a confidence in the local model result.

The first processor may be configured to send the data, further data derived from the data and/or the local model result in dependence on a comparison between the confidence in the local model result and a confidence threshold.

The first processor may be configured to send a local model update request from the electronic device based on the measure of the quality of the local model result.

The further data derived from the data may be preprocessed data or features data extracted from the preprocessed data.

The first processor may be configured to send the preprocessed data and/or the features data from the electronic device to the second processor based on the measure of the quality of the local model result, the second processor may be configured to use the processed data and/or the features data to update the global model.

The electronic device may comprise at least one of an end node, a domestic device, a fridge, a cooker, a television, a plug, a bulb, a light, a security system, a door lock, a camera, a heating system, a thermostat, a speaker, a mobile telecommunications device, a smart phone, a vehicle device, an industrial device, a manufacturing device, a wearable device and a medical device.

The data may comprise sensor data from at least one of a temperature sensor, a proximity sensor, an accelerometer, an IR sensor, a pressure sensor, a light sensor, an ultrasonic sensor, a smoke sensor, a gas sensor, an alcohol sensor, a touch sensor, a colour sensor, a humidity sensor, a tilt sensor, a flow and level sensor, an optical sensor, an electric current sensor, an electric potential sensor, a magnetic sensor, a chemical sensor, a radiation sensor, an altimeter sensor, a force sensor, a radio sensor, a speed sensor, a fluid sensor and a position sensor.

The machine learning process may comprise at least one of decision tree learning, association rule learning, artificial neural networks, deep learning, inductive logic programming, support vector machines, clustering, bayesian networks, reinforcement learning, representation learning, similarity and metric learning, sparse dictionary learning, genetic algorithms, rule-based machine learning and learning classifier systems.

According to a further embodiment there is provided a method comprising: obtaining data at an electronic device; applying a local model on the electronic device to the data or further data derived from the data to obtain at least one local model result, wherein the local model is obtained by the use of a machine learning process; generating a measure of the quality of the local model result using a first processor; and sending the data, further data derived from the data and/or the local model result to a second processor for use in updating a global model based on the measure of the quality of the local model result.

The method may further comprise activating an update of the global model based on the measure of the quality of the local model result to obtain the updated global model.

The processing resource may be linked by a network to a plurality of electronic devices, the method may further comprise sending updated global model data to at least one of the electronic devices and updating the local model on the respective electronic devices based on the updated global model data.

The further data derived from the data may be pre-processed data or features data extracted from the pre-processed data. The method may further comprise generating a measure of the quality of the updated global model result in dependence of the updated global model; sending a request from the second processor for the pre-processed data or features data extracted from the pre-processed data based on the measure of the quality of the updated global model result; and sending the pre-processed data or features data extracted from the pre-processed data through the communication device to the second processor for use in updating the global model. The request from the second processor for the pre-processed data or features data extracted from the pre-processed data may be sent when the confidence in the updated global model result is below a confidence threshold.

According to another embodiment there is provided a method comprising: receiving, by a second processor, data, further data derived from the data and/or at least one local model result sent from a first processor on an electronic device, the second processor including a global model, wherein the second processor is linked by a network to a plurality of electronic devices; activating, by the second processor, an update of the global model by a machine learning process based on a measure of the quality of the local model result from the local model to obtain an updated global model; sending updated global model data to at least one of the electronic devices to update their respective local models based on the quality of the local model result.

According to another embodiment there is provided a non-transitory storage medium comprising computer program instructions, the computer program instructions, when executed by the first and/or second processor, are configured to cause the first and/or second processor to perform any of the aforementioned methods.

An advantage of the embodiments is that informed decisions may be made regarding when to update electronic device local models. In addition, model accuracy may be improved with a reduction in communication overheads.

FIG. 1A shows a conventional system 101 which includes edge nodes (i.e. electronic devices) 102 ($D_1$), 104 ($D_2$) and 106 ($D_n$) connected via a network 108 to a computer server 110 (i.e. a backend system). It will be appreciated that there could be any number of edge nodes connected to the network (i.e. up to n). The edge nodes 102-106 may include sensors to obtain raw data.

The edge nodes 102-106 send raw data (e.g. data that has not been processed) through the network 108 to the computer server 110. The computer server 110 includes a model 110M which is constantly updated as the computer server 110 continues to receive new raw data from the edge nodes 102-106. In this situation, the communication overhead is relatively high, since raw data is transported constantly. This means that the accuracy of the model 110M is also relatively high, as the use of fine grained data can help to achieve model accuracy. To keep the cost of the end nodes down, a trade-off is made in terms of communication overhead and the subsequent centralised processing of the data that is gathered.

An alternative approach would be for the edge nodes devices to carry out some processing of the data and send a "summary" to the backend system thereby avoiding the huge communication overhead associated with transporting raw data and at the same time minimise overwhelming the backend system.

Figure 1B:
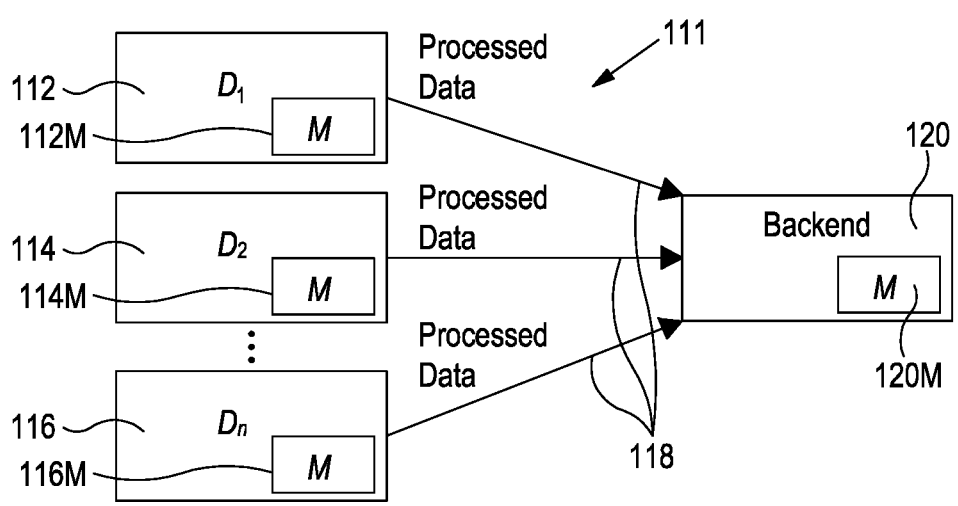
FIG. 1B shows a schematic representation of a conventional device transporting summary data.

FIG. 1B shows a conventional system 111 which includes edge nodes (i.e. electronic devices) 112 ($D_1$), 114 ($D_2$) and 116 ($D_n$) connected via a network 118 to a computer server 120 (i.e. a backend system). The edge nodes 112-116 may include sensors to obtain raw data. The edge nodes 112-116 each have a respective local model 112M, 114M, 116M.

The edge nodes 112-116 send processed data (e.g. summary data) through the network 118 to the computer server 120. The summary data may be only transported at predetermined time intervals. The computer server 120 includes a model 120M which is constantly updated as the computer server 110 continues to receive new processed data from the edge nodes 112-116. In this situation, the communication overhead is relatively low, since only summary data (i.e. processed data rather than raw data) is transported constantly. The accuracy of the model 120M is relatively low because it is outdated. To be up to date the models M need to be trained and updated with raw/pre-processed/feature data. In FIG. 1B, this is not the case as the model M is static and pre-trained before deployment.

Recent advancements in hardware have made this possible and the costs involved in accomplishing this continue to decline leading to the emergence of the so-called "edge computing" paradigm. In other words, data is now processed at the "edge" of the network and "summaries" are then transported over the "core" network leading to a reduction in communication overhead. Whilst this is certainly an attractive proposition, the processing function at the edge still remains static and therefore opportunities for further optimisation are lost.

Conventional approaches may thus either be driven by a single model or are updated more frequently than necessary. The conventional system 111 shown in FIG. 1B is one of baseline approaches (i.e. baseline 1) which are compared to the proposed method for which the results are later shown in FIGS. 5-7. For the conventional system 111 in FIG. 1B (baseline 1), the model is static with low accuracy (with low communication overhead).

The conventional system 101 shown in FIG. 1A is another baseline approach (baseline 2), in which raw data is transmitted and model M is kept up-to-date with new data. As shown later in FIGS. 5-7, this results in a good accuracy, the model is dynamic, but with a very high communication overhead.

Figure 2:
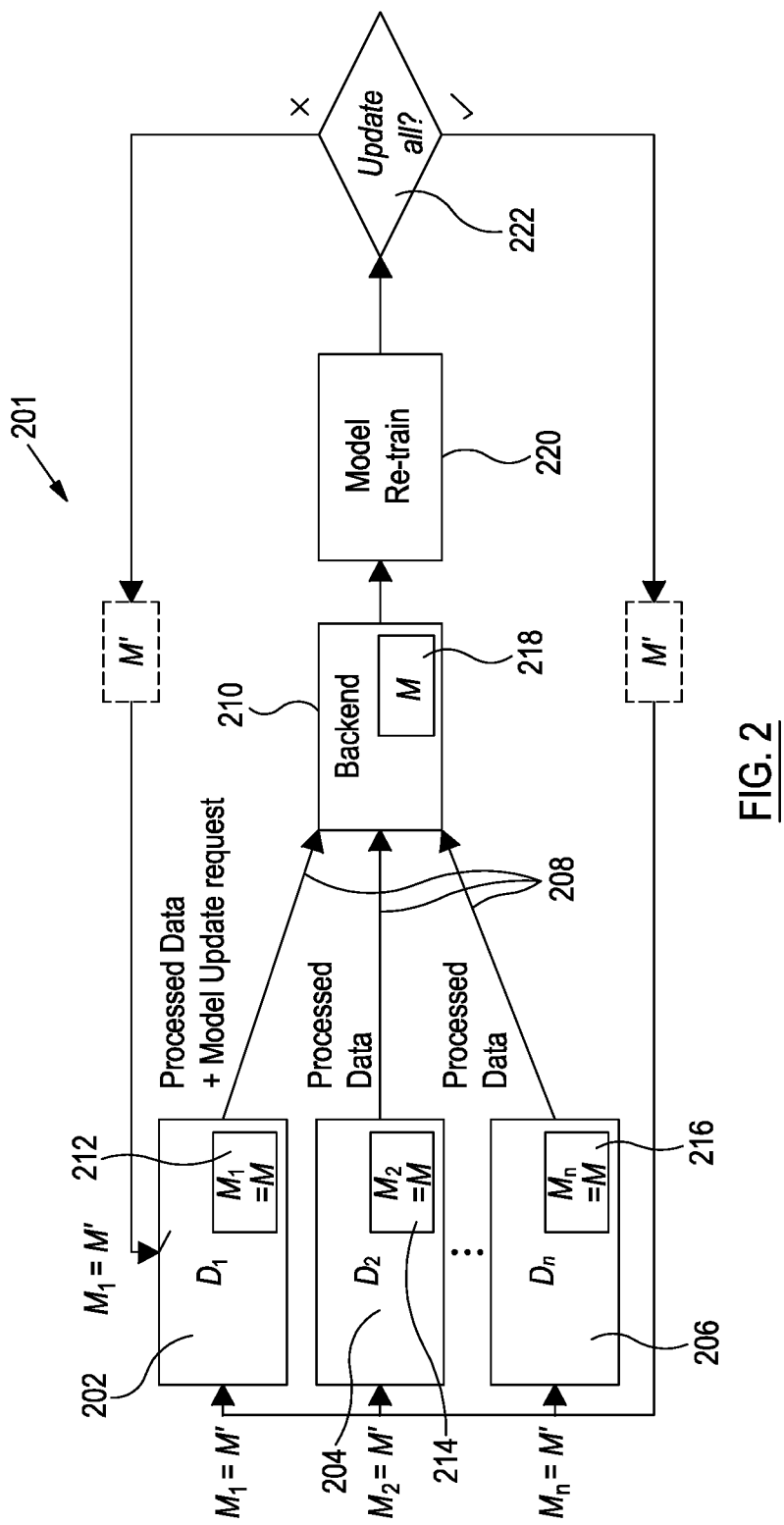
FIG. 2 shows a schematic representation of a device according to an embodiment.

FIG. 2 shows a device 201 according to an embodiment. FIG. 2 shows electronic devices 202 ($D_1$), 204 ($D_2$) and 206 ($D_n$) connected (or linked) via a network 208 (i.e. a communication device) to a computer server 210 (i.e. a backend system). It will be appreciated that there could be any number of electronic devices connected to the network (i.e. up to n). The electronic devices 202-206 may be edge nodes. The electronic devices 202-206 may each include a first processor. In other examples, the computer server may be any type of processor. The computer server 210 may be a second processor. The computer server 210 may include a second processor.

The electronic devices 202-206 may include sensors to obtain data (e.g. raw data). The first processors of the electronic devices 202-206 send raw data (e.g. data that has not been processed) and/or processed data (e.g. summary data) through the network 208 to the computer server 210.

The electronic devices 202-206 each contain respective local models 212 ($M_1$), 214 ($M_2$), 216 ($M_n$). The computer server 210 includes a global model 218 (M). The local models $M_1$, $M_2$, $M_n$ in the respective electronic devices 202-206 are a copy of the global model M in the computer server 210, e.g. $M_1$=M.

A model may receive input data of a particular form and provide a result (an output) based on the data. The result may be predictive and/or indicative of the state of a device or system or environment etc. The input data may comprise at least one measurement of a physical parameter and/or an operating parameter and/or a device parameter etc.

The computer server 210 includes a memory resource which stores the global model M. The global model M is obtained by the use of a machine learning process.

The electronic device 202 includes a memory resource which stores the local model $M_1$. The local model $M_1$ is obtained by the use of a machine learning process. The first processor in the electronic device 202 is configured to obtain the raw data at the electronic device 202 and apply the local model to the raw data to obtain a local model result. In other examples, the local model may be applied to pre-processed data.

The electronic device 202 makes a prediction using features computed from raw data and sends the predicted value (i.e. a local model result) to the computer server 210 (backend system). Typically, a machine learning model that generates a prediction also generates a confidence score associated with the prediction. The confidence score may be considered to be a measure of the quality of the local model result.

Depending on the confidence in the prediction or predictions generated by the electronic device 202, it may be necessary to update the local model $M_1$ (if the prediction confidence is low). In such a case, the electronic device 202 should be able to send data and a model update request to the computer server 210. The first processor of the electronic device 202 sends the processed data through the network 208 to the computer server 210 to update the global model M based on the confidence in the prediction (i.e. the local model result). More particularly, the data is sent in dependence on a comparison between the confidence of the local model result and a confidence threshold. That is, based on the confidence in the prediction, a decision is made to update the global model M. The global model M may be updated using either the raw data or processed feature data as explained in more detail later. In some examples, the local model result may be sent to the computer server 210.

The first processor determines whether to send the processed data and/or the local model result through the network 208 to the computer serve 210 for use in updating the global model 218 based on the comparison between the confidence in the local model result and the confidence threshold. In one example, it may be determined using a threshold based decision using a single confidence estimate when to send the data to the computer server 210. However, if there are cases when a classifier is producing multiple outputs, then a threshold alone may not be sufficient. Therefore it may be useful to consider confidence scores related to all types of outputs to make a decision regarding model updates. For such complex situations, an algorithm may be used to implement this. An algorithm may be used to determine, based on the confidence score, when it is necessary to send the data to the computer server 210.

The computer server 210 can then "update" the global model M using the new features/data provided by the electronic device 202 (edge node). The update of the global model M may be considered to be retraining 220 of the global model M. This may be by using a machine learning method.

Subsequently, the computer server 210 sends the updated model M' to the electronic device 202 that requested an update or to all the electronic devices 202-206 that the computer server 210 is connected to. That is, the computer server 210 is linked by the network 208 to the plurality of electronic devices 202-206 and the computer server 210 is configured to send the updated global model data (M') to at least one of the electronic devices 202 and update the local model $M_1$ on the respective electronic devices 202-206 based on the updated global model data (M).

In other examples, the updated model M' may be sent to one or more electronic devices not including the electronic device 202 that provided the data to update the global model 218. In other examples, the updated model M' may be sent to a plurality of the electronic devices, i.e. not all the electronic devices connected to the network.

Figure 3:
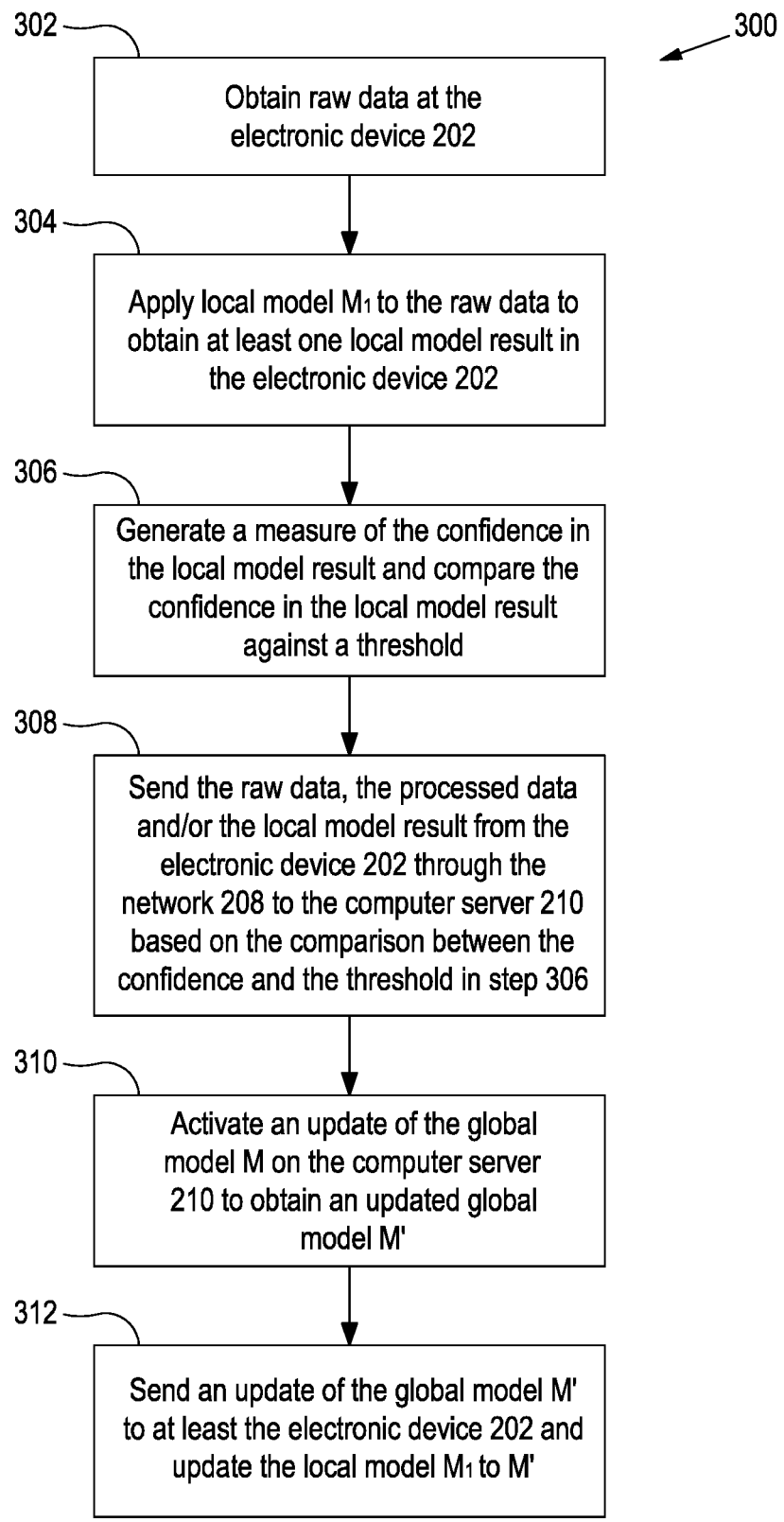
FIG. 3 shows a method according to an embodiment.

FIG. 3 shows a method 300 of an embodiment. In step 302 data (e.g. raw data) is obtained at the electronic device 202 by the first processor. Then, in step 304, the first processor applies the local model $M_1$ to the raw data to obtain at least one local model result in the electronic device 202. The local model result may be considered to be a predicted value or a prediction. In other examples, there may be a plurality of local model results.

In step 306, the first processor in the electronic device 202 generates a confidence in the local model result. This may be considered to be a measure of the quality of the local model results. The confidence in the local model result is then compared against a threshold.

In some examples, the confidence may be measured using a probability estimate between 0 and 1. When a classifier is confident about the output, it produces the scores closer to 1 and when a classifier is not confident about the output it produces a score closer to 0. In some examples, a confidence score of 0.9 may be used as the confidence threshold ($t_c$). This may suggest that the classifier has to be very confident about the quality of the output. In this case, if the confidence probability estimate is less than 0.9, then the global model may be re-trained. In other examples, the confidence threshold may be any other value depending on the application and communications requirements.

In step 308, the raw data, the processed data and/or the local model result from the electronic device 202 is sent through the network 208 to the computer server 210 based on the comparison between the confidence in the local model result and the threshold in step 306. For example, if the confidence in the local model result is less than the threshold value then the data is sent. On the other hand, if the confidence in the local model result is equal to or not less than the threshold value then the data is not sent. Thus, the first processor of the electronic device 202 is configured to send the data, further data derived from the data and/or the local model result in dependence on a comparison between the confidence in the local model result and the confidence threshold. An algorithm may be used to automatically compare the confidence score and the threshold and determine when data should be sent to the computer server 210.

In some examples, the method includes determining in dependence on the measure of the quality of the local model result (e.g. based on the comparison between the confidence in the local model result and the threshold) whether to send the raw data, data derived from the raw data and/or the local model result through the network 208 (communication device) to the computer server 210 (second processor) for use in updating the global model 218.

It will be understood that the steps 302, 304, 306, 308 may be carried out using a single processor or a plurality of processors and the term first processor may be considered to cover each of these examples.

In step 310, the raw data, the processed data and/or the local model result is received by the computer server 210 and this activates an update of the global model M on the computer server 210. The updating of the global model by a machine learning process provides an updated global model M' on the computer server 210. The update of the global model M is based on the confidence in the local model result. This is because the global model M update only occurs when the confidence in the local model result falls within a particular range (e.g. lower than a pre-set confidence threshold) and data is sent. In some examples, the global model M update will automatically begin when data is received from the electronic device 202. The action in step 310 may be carried out by the second processor.

The electronic device 202 may be considered to be sending a model update request to the computer server 210. This may be an explicit request for an update to the local model M1 or may be due to the data being sent from the electronic device 202. In step 312, following the request for a model update from the electronic device 202, the computer server 210 (i.e. the second processor) sends the updated global model M' to the electronic device 202. The local model $M_1$ on the electronic device 202 is then updated with the updated global model M'. This means that $M_1$=M'. The actions in step 312 may be carried out by the second processor and/or the first processor.

In some examples, the local models M1-Mn on all of the electronic devices 204-206 may be similarly updated with the updated global model M'. In these cases, M2=M' and Mn=M' etc. As shown in FIG. 2, there is a "Update all?" decision point 222 where it is decided whether only the electronic device 202 (illustrated by the symbol x v(i.e. NO) near "Update all?" decision point 222) or all of the electronic devices 202-206 (illustrated by the symbol ✓ (i.e. YES) near "Update all?" decision point 222) are to be updated with the new global model M'. This may be predetermined or may be dependent on some other factor, such as on the data transferred or local model result. In other examples, the updated global model M' may be updated on a plurality of the electronic devices rather than all the electronic devices connected by the network 208.

Once the electronic device 202 has been updated with the updated global model M' to have an updated local model M' then the first processor may apply the updated local model M' to the raw data obtained by the electronic device 202. The method of optimising the models can then be repeated.

The above description has been concerned with the electronic device 202 sending the raw data, the processed data and/or the local model result but it will be appreciated that each electronic device 204-206 may be capable of carrying out this method.

The electronic devices sending the summary data (i.e. processed data) and updating the local models accordingly means that the communication overhead is at a medium level (relative to the conventional systems of FIG. 1A and FIG. 1B.) This summary data may include new feature information and/or a model update request. The accuracy of the global model M on the computer server 210 is at a relative medium level. This is because that, although not all the raw data is being transported constantly, the global model is receiving data when it has been determined that the confidence in the local model results is not at a predetermined level (i.e. when there is a significant deviation from expected values). This detection of the significant deviation triggers a global model M update in the computer server 210. The updated model M' being sent to the electronic devices 202-206 therefore improves their prediction performance.

As mentioned above, small scale decision making can be performed on the electronic devices (edge device), for example making decisions using a pre-trained model (the local model) with captured data. The device 201 and method of the embodiment is capable of optimising the performance of such a pre-trained model that can be placed on an edge device. New IoT devices added to the infrastructure can be dealt with whereby the pre-trained model can readily be used. In the case where performance is not maintained, the algorithm can automatically recognise such a situation and report data to the central computer server where the existing model is re-trained and updated on some or all of the edge devices.

The device 201 and method described allows informed decisions to be made regarding when to update electronic device local models. Model accuracy is improved when compared to having a single model. Less time in training is required compared to the approach in which models are trained frequently, without a significant drop in model accuracy. Further advantages also include reduced communication overheads required for re-training models compared against a baseline. Embodiments of the invention can also function in a mixed mode deployment setting where edge devices (electronic devices) can be both static and mobile.

In some examples, the global model may be on the electronic device, i.e. the global model is the local model. That is, there is no central computer server as such. In this case, the local/global model on the electronic device is updated and then this updated global model is sent to one or more electronic devices via a network. In this situation, the second processor may be considered to be on the electronic device and the communication device may be at least partially within the electronic device rather than being an external network. This also means that the local model on each electronic device could become the global model that is updated.

In other examples, the measure of the quality of the local model results may be a different measure from the confidence in the local model result. There may be cases when non-probabilistic models are used when their confidence scores cannot be relied upon. For example, when using a particular classification model like k-nearest neighbours with k=1, the confidence scores are either 0 or 1. It is, then, very difficult to assess the quality of the model by just looking at extreme scores such as these. In cases where k>1, the confidence scores can then be used for making these decisions.

The first processor of the electronic device 202 may send the data, further data derived from the data and/or the local model result through the network 208 (communication device) to the computer server 210 (second processor) for use in updating the global model 218 based on the measure of the quality of the local model result. The computer server 210 may be configured to activate an update of the global model M 218 based on the measure of the quality of the local model result to obtain the updated global model M'.

The first processor of the electronic device 202 may be configured to send the data, further data derived from the data (e.g. feature data derived from the raw data) and/or the local model result to the computer server 210 (second processor) in dependence on a comparison between the measure of the quality of the local model result and a quality threshold. The computer server (second processor) may be configured to activate the update of the global model in dependence on a comparison between the measure of the quality of the local model result and the quality threshold.

Figure 4:
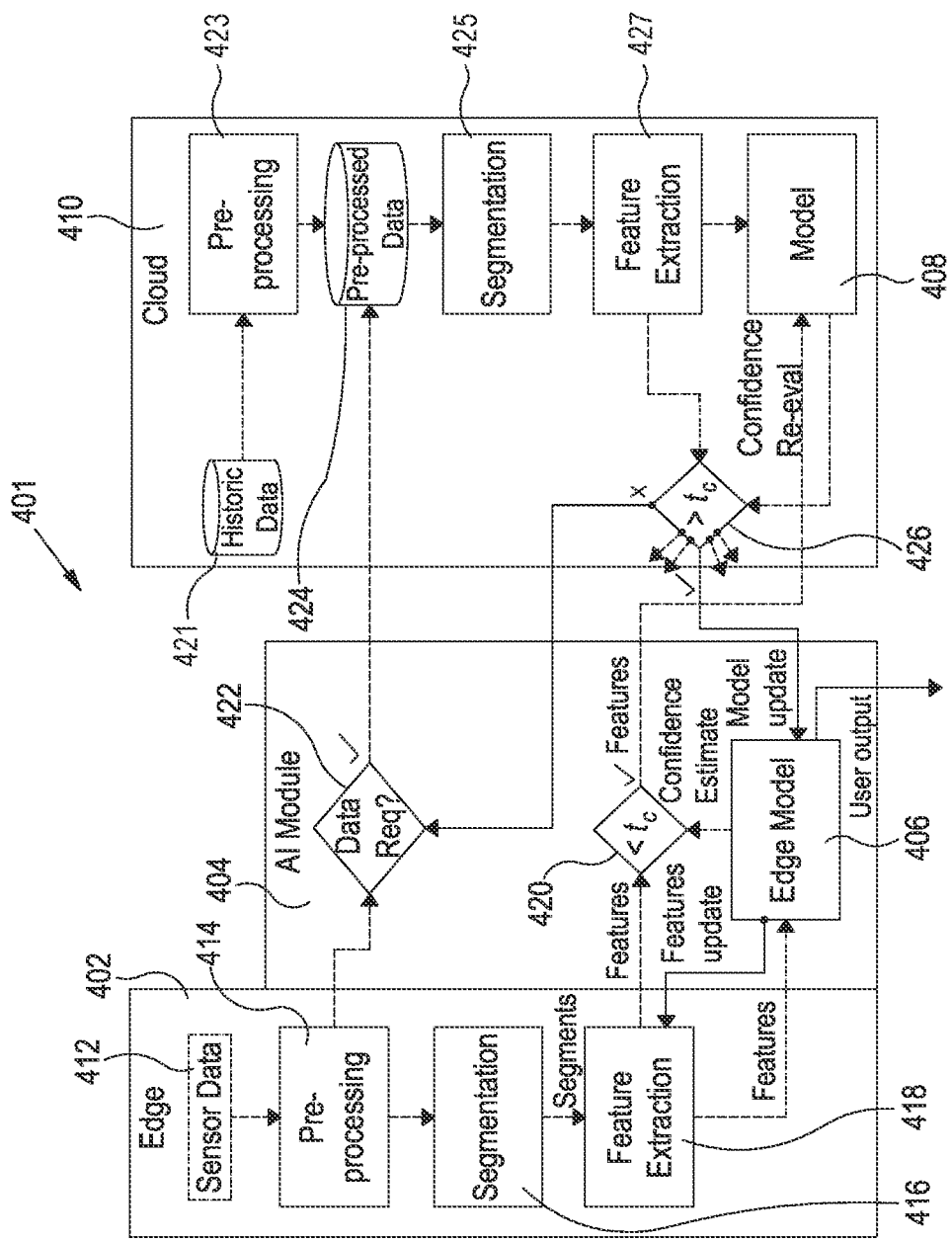
FIG. 4 shows a schematic representation of a device according to an embodiment.

FIG. 4 shows a schematic representation of a device 401 for optimising intelligent edge computing. Device 401 includes an edge node 402 (electronic device) which includes an AI (artificial intelligence) module 404. The AI module 404 includes an edge model (a local model) 406. The edge model 406 is obtained by the use of a machine learning process and is updated from a global model 408 on a cloud based server 410 (e.g. a second processor).

The edge node 402 has a first processor which obtains sensor data 412 (e.g. raw data) and pre-processes the sensor data 412 at a pre-processing step 414. For example, when raw data is collected from multiple sensors, they may require fusion. Resampling may also be required as the data is not always collected at a guaranteed sampling rate; this includes steps like interpolation. In addition, there may be noisy data samples that can be filtered out during the pre-processing step 414.

The data processed from the sensor data 412 (pre-processed data) may be considered to be data derived from the raw data. The pre-processed data may then be segmented at a segmentation step 416 and the pre-processed data may have features extracted at a feature extraction step 418. The features data extracted from the pre-processed data may be considered to be data derived from the raw data.

The features (features data) extracted are then fed into the edge model 406. The edge model 406 is applied to the features extracted and a user output (i.e. a local model result) is obtained. The user output may be passed onwards to be used as desired or, in other examples, may be passed to the cloud server. The first processor may carry out each of these steps or they may be carried out by a plurality of processors.

A confidence estimate is produced that is associated with the prediction (local model result) from the edge model 406 by the first processor. The confidence estimate is passed to a features decision point 420 where it is determined whether the confidence estimate is less than a confidence threshold $t_c$ (i.e. confidence estimate<confidence threshold $t_c$). If the confidence estimate is less than the confidence threshold $t_c$ (illustrated by the symbol ✓ (i.e. YES) near features decision point 420) then the features (features data), which were also passed to features decision point 420, are communicated to the global model 408 in the cloud server 410. This communication may be through a communication device (e.g. a network).

It is determined in dependence on the confidence estimate (e.g. based on the comparison between the confidence in the local model result and the threshold) whether to send the raw data, data derived from the raw data and/or the local model result through the communication device to the cloud server 410 to update the global model 408.

The features being fed into the global model 408 enable an updated global model to be determined, i.e. the global model 408 is updated with the features extracted from the pre-processed data in the edge node 402. The features being received by the cloud server 410 may activate the update of the global model 408. A features update may also be provided from the edge model 406 to the feature extraction step 418.

The pre-processed data is passed from the pre-processing step 414 to a pre-processed data request point 422. If a request is made for pre-processed data (illustrated by the symbol ✓ (i.e. YES) near pre-processed data request point 422) then this means that the confidence levels are still low, as evaluated in the cloud server 410 which will be explained later. In this case, pre-processed data is required to be passed to the cloud server 410 to update the global model 408 with possibly new features. This passing of data (communication) may be through the communication device (e.g. the network).

The pre-processed data from the edge node 402 is combined with pre-processed historic data 421 at a pre-processed data step 424 in the cloud server 410 (historic data 421 being pre-processed at pre-processing step 423). This combined pre-processed data is segmented at a segmentation step 425 and features are extracted (in a Feature Extraction block 427) and then fed to a cloud server decision point 426. The features are also fed into the global model 408. That is, the global model 408 is also updated with the features extracted from the combined pre-processed data in the cloud server 410. Thus, the cloud server 410 is configured to update the global model 408 in response to the data, the further data derived from the data and/or the local model result being received by the cloud server 410.

Thus, the first processor of the edge node 402 is configured to send the pre-processed data and/or the features data from the edge node 402 to the cloud server 410 (second processor) based (i.e. dependent) on the confidence in the local model result. The cloud server 410 is configured to use the processed data and/or the features data to update the global model 408.

The global model 408 is run using the features extracted from the pre-processed data in the cloud server 410 and the features from the edge node 402. The confidence in the results (prediction) is revaluated and then passed to cloud server decision point 426. The confidence in the results (prediction) may be considered to be generating a measure of the quality of the update of the global model 408 in dependence of the update of the global model 408. If the re-evaluated confidence>confidence threshold $t_c$ (illustrated by the symbol ✓ (i.e. YES) near cloud server decision point 426) then the edge model 406 is updated with the updated global model 408. The updated global model 408 may also be sent (illustrated by four small arrows pointing out of cloud server decision point 426) to other edge nodes (not shown) to update their local models. If the re-evaluated confidence is not greater than the confidence threshold $t_c$ (illustrated by the symbol x (i.e. NO) near cloud server decision point 426) then pre-processed data is requested from the edge node 402 at pre-processed data request point 422. That is, a request is sent the cloud server 410 for the pre-processed data based on the measure of the quality of the update of the global model 408. Then the pre-processed data is sent to the cloud server 410. The pre-processed data may be used for updating the global model 408 again. This request may be made through the communication device (e.g. the network).

As mentioned previously, a features update may also be provided from the edge model 406 to the feature extraction step 418. When updating the global model 408, feature data is initially sent through features decision point 420. After updating the global model 408, if there is a case that the confidence estimates are not improved through cloud server decision point 426, then a request for pre-processed data is made at pre-processed data request point 422. In this case, a new set of feature types may be computed in the Feature Extraction block in the cloud server 410. If this results in the confidence improvement then it means that new feature types must now also be calculated in feature extraction step 418.

The first processor of device 401 is thus configured to send the pre-processed data and/or the features data from the edge node 402 to the cloud server 410 (i.e. second processor) based on the confidence estimate (i.e. the measure of the quality of the local model result). In other examples, raw data may be sent to the cloud server 410 based on the confidence estimate, without being processed first. The cloud server 410 is configured to use the processed data and/or the features data to update the global model 408. It will be appreciated that the cloud server may be any type of processor.

In the embodiment described, the data (i.e. further data derived from the data) and/or the local model result is sent from the edge node (electronic device) 402 through a communication device (e.g. a network) to the cloud server (second processor) 410 for use in updating the global model 408 based (or dependent) on a comparison between the confidence in the local model result (e.g. a predication) and the confidence threshold. The determination of when to send the data, when to update the global model 408 and when to send the updated global model 408 to update the local edge model 406 is also based (or dependent) on a comparison between the confidence in the local model result (e.g. a predication) and the confidence threshold. In other examples, the sending of the data and the determination of when to send the data, when to update the global model 408 and when to send the updated global model 408 to update the local edge model 406 may be based on a measure of the quality of the local result. More particularly, these scenarios may be in dependence on a comparison between the measure of the quality of the local model result and a quality threshold.

In an embodiment, the electronic device may be e.g. at least one of an end node, a domestic device, a fridge, a cooker, a television, a plug, a bulb, a light, a security system, a door lock, a camera, a heating system, a thermostat, a speaker, a mobile telecommunications device, a smart phone, a vehicle device, an industrial device, a manufacturing device, a wearable device and a medical device.

In an embodiment, the raw data may comprise sensor data from e.g. at least one of a temperature sensor, a proximity sensor, an accelerometer, an IR sensor, a pressure sensor, a light sensor, an ultrasonic sensor, a smoke sensor, a gas sensor, an alcohol sensor, a touch sensor, a colour sensor, a humidity sensor, a tilt sensor, a flow and level sensor, an optical sensor, an electric current sensor, an electric potential sensor, a magnetic sensor, a chemical sensor, a radiation sensor, an altimeter sensor, a force sensor, a radio sensor, a speed sensor, a fluid sensor and a position sensor.

The sensor data may be the output of a device that detects and responds to some type of input from the physical environment. The output may be used to provide information or input to another system or to guide a process. The sensor data may, for example, include measurements, individual measurement points, etc.

Figure 5:
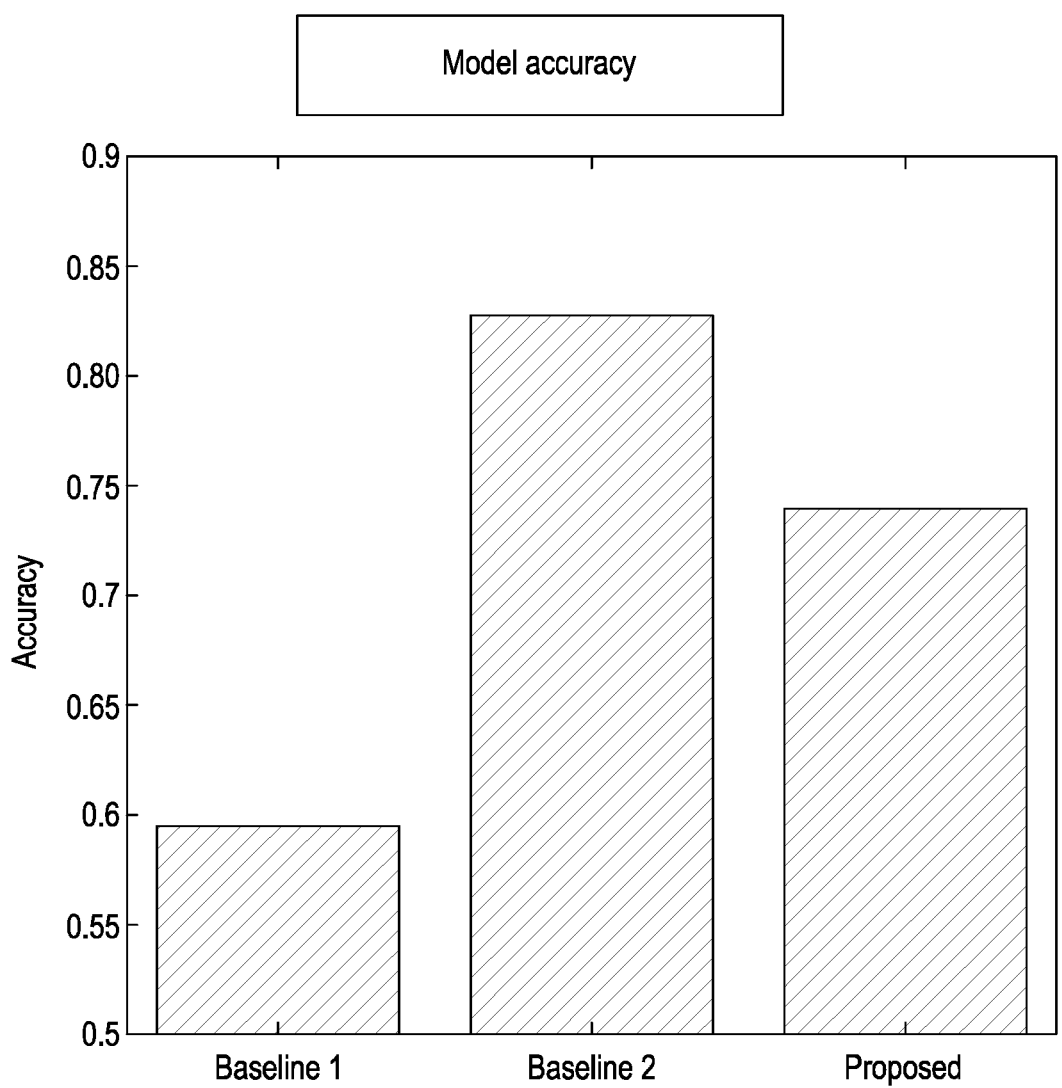
FIG. 5 shows a graph of model accuracy comparisons between the method according to an embodiment and two baseline models using a walking activity dataset.
Figure 6:
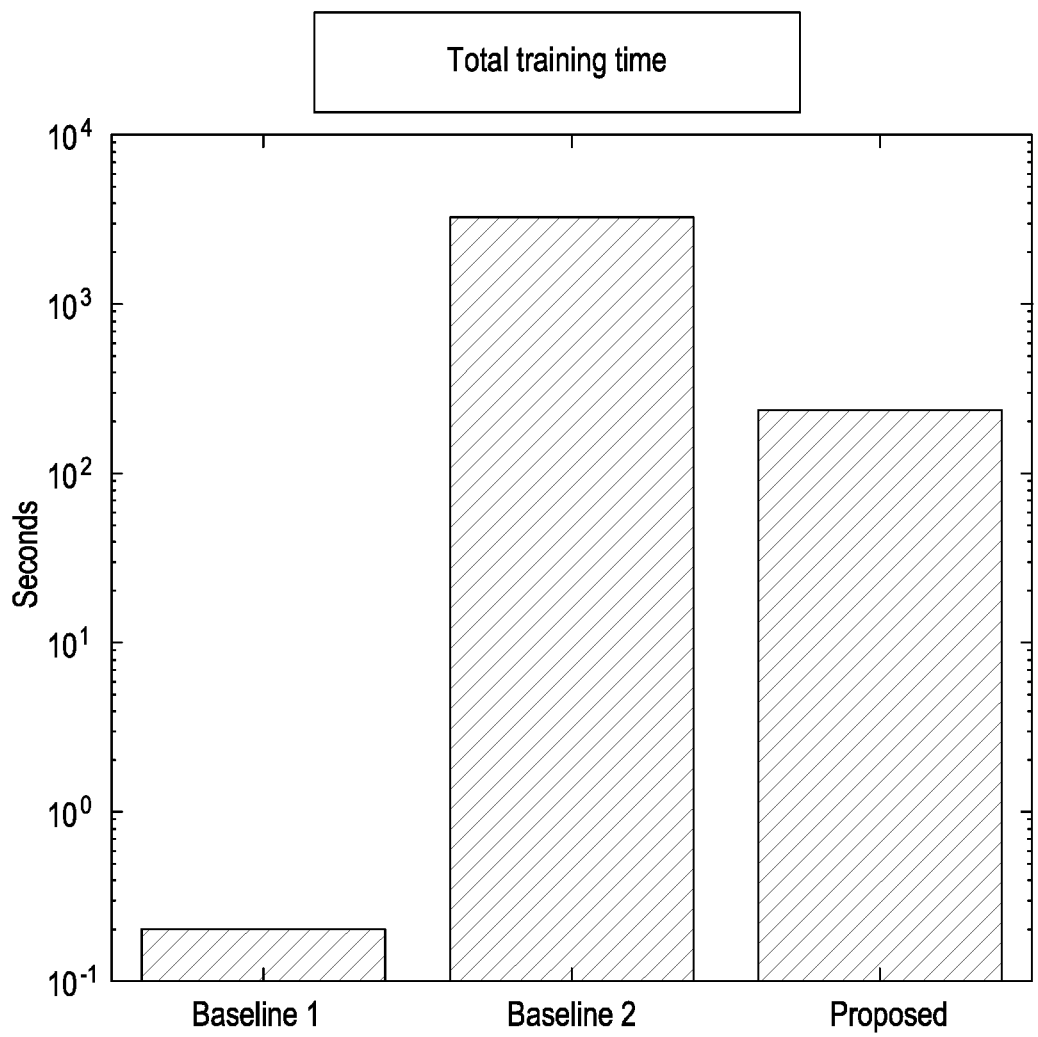
FIG. 6 shows a graph of total training time comparisons between the method according to an embodiment and two baseline models using a walking activity dataset.
Figure 7:
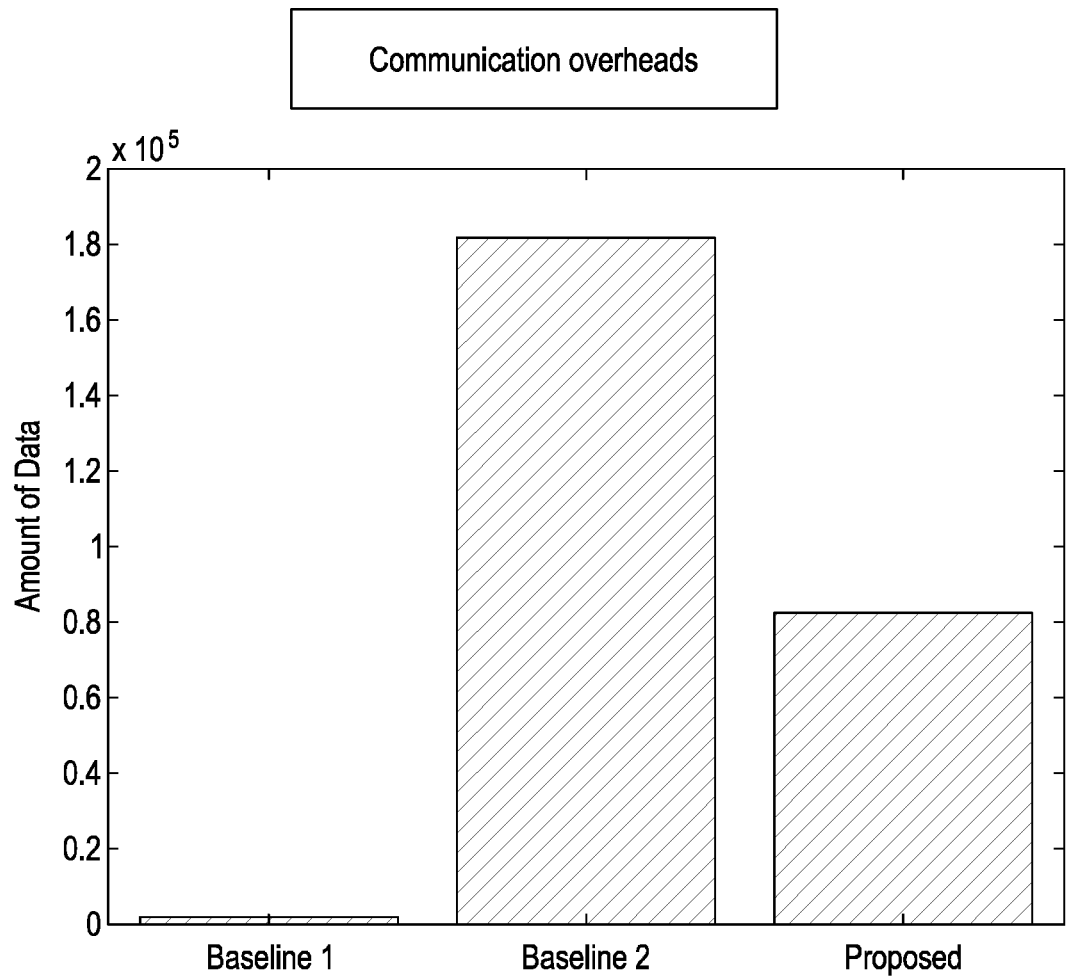
FIG. 7 shows a graph of communication overhead comparisons between the method according to an embodiment and two baseline models using a walking activity dataset.

FIGS. 5, 6 and 7 show graphs of performance comparisons using a walking activity dataset. There are two baselines used for comparison against a method of an embodiment (i.e. the proposed method). These are all in the context of edge intelligence applications.

1) Baseline 1: A pre-trained model with 20% of data is trained and used for testing on the remaining data. This is the case in some of the conventional approaches where an edge device holds a pre-trained model. There are no update capabilities and as such the performance of such methods might drop as new data is collected, and in new scenarios.

2) Baseline 2: This is a non-optimal model which initially starts with a similar model trained on the 20% of the data however it is updated with new data every frame (each frame represents a window of time in the example application). This could be optimised with fixed set of intervals, however that approach does not guarantee a suitable performance target.

The proposed approach starts with the same model trained on 20% of the data but it is updated only when the decision made by the model falls below a certain confidence threshold. This threshold is set differently for different types of machine learning classifiers. We use a score of 0.9 for SVM (support vector machine) classifier i.e., if a decision made by the classifier has a confidence score of less than 0.9 then we use the collected data for that frame to retrain the model.

In practical terms, this would mean communicating the data which resulted in such low scores and therefore the retraining process takes place on the server/cloud side where more computational resources are available. Performance comparisons in terms of the model accuracy are shown in FIG. 5. Performance comparisons in terms of total training time are shown in FIG. 6 in seconds. After retraining, either all edge models are updated or only on the edge device from where the model update request was originally received. Such application specific decision can be made according to FIG. 2.

FIG. 7 shows the communication overheads comparisons between the two baselines and the proposed approach. In the case of baseline 1 where training is performed only once, the total number of samples to communicate is the same as the total number of decisions (considering a single decision output is used) the node makes. The y-axis of FIG. 7 is the total amount of data send to the backend. Below is the overheads breakdown for the three approaches:

Overheads Calculations:
- Total samples in the dataset=1739
- Total training samples=348 (20%)
- Total test samples=1391 (80%)
- Size of a single frame (number of features)=130
- Number of times confidence score was below the threshold=625 out of 1391
- Baseline 1=1391
- Baseline 2=1391+1391×130=182221
- Proposed=1391+625×130=82641

In other words, there are 1391 decisions for baseline 1, which may be considered to just be a local model result from a local model (c.f. "a user output" from the edge model 406). For baseline 2, it is 1391 decisions from a local model+all the feature data which is a large matrix of the size 1391×130. In the proposed method, not all data is sent and the data that is sent is driven by the confidence scores. When a confidence threshold $t_c$ of 0.9 is used, for 1391 total decisions, there may be 625 times that the model threshold is less than 0.9 and it sends the data. Therefore, the total amount of data is 1391 decisions+625×130.

It can be seen from the graphs of FIGS. 5, 6 and 7 that the method of an embodiment (the proposed method) provides a level of model accuracy, total training time, and communication overheads that fall in between the levels of baselines 1 and 2. Thus, the proposed method provides a balance of model accuracy without having relatively large training time and communication overheads.

Another exemplary application is provided in the context of Smart Parking. In this application, we consider deployment of an embodiment of the system on a number of edge devices (these could be mobile phones or cars). The main purpose of the edge in this context is to collect sensor data from various sensors (such as IMUs) and determine whether someone is cruising (i.e., searching for parking) or not. A model can be pre-trained and deployed on the edge devices in this context, however since the training stage is much shorter compared to the deployment stage, the model cannot possibly be representative. Training stage is not only limited by time but also the number of users.

For this purpose, when such a pre-trained model is deployed, it will initially make several mistakes (in the form of either false positives or false negatives). Not only this, the model will also expectedly make low confidence decisions. An embodiment uses these confidence scores to make a decision about updating the model on one or more edge devices. Depending on the use case, if such a situation arises, the system can either update the model on a single edge device or multiple devices.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A system comprising:
a plurality of electronic devices that each include a first processor and a sensor, the first processor being configured to perform an automated decision making function with a local model; and
a second processor,
the second processor being configured to
receive features data and a local model result through a communication device from the first processor of an electronic device of the plurality of electronic devices only in response to the confidence score of the local model result being lower than a first threshold, the features data and the local model result being for use in updating a global model stored at the second processor, the global model being used in common with the plurality of electronic devices including the electronic device, the local model result including a first predicted value obtained by applying a local model to features data derived from raw data obtained at the electronic device, wherein the local model is obtained by use of a first machine learning process and the confidence score is a probability estimate associated with the first predicted value,
update the global model based on the received features data and the received local model result by use of a second machine learning process,
send the updated global model to all of the electronic devices including the electronic device, wherein the first processor updates the local model with the updated global model, the updated local model being the updated global model, when an evaluated confidence score of the updated global model is not lower than a second threshold, the evaluated confidence score being associated with a second predicted value using features data by applying the updated global model,
send, to the first processor, a request for pre-processed data for use in updating the global model when the evaluated confidence score of the updated global model is lower than the second threshold, and
receive the pre-processed data through the communication device from the first processor based on the request, the global model being updated with features extracted from the pre-processed data in the electronic device,
the first processor of an electronic device of the plurality of electronic devices being configured to:
obtain the raw data at the electronic device;
apply the local model on the electronic device to features data to obtain the local model result, the features data being derived from the raw data, the local model result including the first predicted value using the features data by applying the local model, wherein the local model is obtained by use of the first machine learning process;
generate the confidence score of the local model result, the confidence score being a probability estimate associated with the first predicted value;
send, to the second processor, the features data and the local model result through the communication device for use in updating a global model only in response to the confidence score of the local model result being lower than the first threshold, the global model being used in common with the plurality of electronic devices, and not send, to the second processor, the features data and the local model result through the communication device for use in updating a global model in response to the confidence score of the local model result being equal to or not being lower than the first threshold;

receive the updated global model data from the second processor when the confidence score of the updated global model is not lower than the second threshold;

receive, from the second processor, a request for pre-processed data for use in updating the global model when the evaluated confidence score of the updated global model is lower than the second threshold; and send the pre-processed data through the communication device to the second processor based on the request, wherein the pre-processed data includes fusion of the raw data collected from multiple sensors of the plurality of electronic devices, by performing at least one of resampling, interpolation, and filtering the raw data.

2. The system according to claim 1, wherein the first machine learning process and the second machine learning process include at least one of decision tree learning, association rule learning, artificial neural networks, deep learning, inductive logic programming, support vector machines, clustering, bayesian networks, reinforcement learning, representation learning, similarity and metric learning, sparse dictionary learning, genetic algorithms, rule-based machine learning or learning classifier systems.

3. The system according to claim 1, wherein the electronic devices include at least one of an end node, a domestic device, a fridge, a cooker, a television, a plug, a bulb, a light, a security system, a door lock, a camera, a heating system, a thermostat, a speaker, a mobile telecommunications device, a smart phone, a vehicle device, an industrial device, a manufacturing device, a wearable device or a medical device.

4. The system according to claim 1, wherein the raw data includes sensor data from at least one of a temperature sensor, a proximity sensor, an accelerometer, an IR sensor, a pressure sensor, a light sensor, an ultrasonic sensor, a smoke sensor, a gas sensor, an alcohol sensor, a touch sensor, a colour sensor, a humidity sensor, a tilt sensor, a flow and level sensor, an optical sensor, an electric current sensor, an electric potential sensor, a magnetic sensor, a chemical sensor, a radiation sensor, an altimeter sensor, a force sensor, a radio sensor, a speed sensor, a fluid sensor or a position sensor.

* * * * *